US009269091B2

(12) United States Patent
George et al.

(10) Patent No.: US 9,269,091 B2
(45) Date of Patent: Feb. 23, 2016

(54) GEOGRAPHIC SEGMENTATION SYSTEMS AND METHODS

(75) Inventors: William Brandon George, Pleasant Grove, UT (US); Kevin G. Smith, Lehi, UT (US); Ian M. Hansen, Springville, UT (US); Pearce Aurigemma, Provo, UT (US); Carl J. Sandquist, Salt Lake City, UT (US)

(73) Assignee: Adobe Systems Incorporated, San Jose, CA (US)

( * ) Notice: Subject to any disclaimer, the term of this patent is extended or adjusted under 35 U.S.C. 154(b) by 1211 days.

(21) Appl. No.: 13/223,220

(22) Filed: Aug. 31, 2011

(65) Prior Publication Data

US 2014/0304391 A1    Oct. 9, 2014

(51) Int. Cl.
| | |
|---|---|
| G06F 11/30 | (2006.01) |
| G06Q 30/02 | (2012.01) |
| H04L 29/08 | (2006.01) |
| H04L 12/24 | (2006.01) |
| H04L 5/00 | (2006.01) |
| H04L 12/58 | (2006.01) |
| G06Q 10/08 | (2012.01) |
| G06Q 50/10 | (2012.01) |

(52) U.S. Cl.
CPC .............. G06Q 30/02 (2013.01); G06Q 10/08 (2013.01); G06Q 50/10 (2013.01); H04L 5/0069 (2013.01); H04L 41/0618 (2013.01); H04L 51/20 (2013.01); H04L 67/18 (2013.01)

(58) Field of Classification Search
CPC ..... H04L 43/04; H04L 43/0876; H04L 43/08; H04L 43/045; H04L 41/22; H04L 67/18; H04L 41/0618; H04L 5/0069; H04L 51/20; G06Q 30/0277; G06Q 30/0242; G06Q 30/0201; G06Q 30/0243; G06Q 30/0255; G06Q 30/0266; G06Q 30/0254; G06Q 30/0261; G06Q 30/02; G06Q 10/08; G06Q 50/10
USPC ........ 709/224, 230, 231, 232, 236; 705/14.45
See application file for complete search history.

(56) References Cited

U.S. PATENT DOCUMENTS

| | | | |
|---|---|---|---|
| 6,199,099 B1 * | 3/2001 | Gershman ......... | G06F 17/30867 707/999.003 |
| 6,765,492 B2 | 7/2004 | Harris | |
| 6,801,778 B2 | 10/2004 | Koorapaty et al. | |
| 6,806,830 B2 | 10/2004 | Panasik et al. | |
| 6,903,685 B1 | 6/2005 | Arndt et al. | |
| 8,417,683 B2 * | 4/2013 | Singh ............................ | 707/706 |
| 8,769,149 B2 * | 7/2014 | Sidi et al. ...................... | 709/245 |

(Continued)

*Primary Examiner* — Kenneth R Coulter
(74) *Attorney, Agent, or Firm* — Kilpatrick Townsend & Stockton LLP

(57) ABSTRACT

Methods and systems for segmenting traffic based on geography include assigning coordinate location data received with respect to members of a plurality of computing devices to analytics data associated with a plurality of requests for content received from respective ones of the plurality of computing devices. A geographical location of interest is defined. The defining the geographical location of interest includes designating a plurality of points defining boundaries of the geographical location of interest. Respective ones of a plurality of traffic segments are assigned to the plurality of requests for content based in part upon a comparison of the geographical location of interest to coordinate location data assigned to respective ones of the plurality of requests for content. Network traffic metrics are generated for ones of the plurality of traffic segments. The request traffic metrics describe request behavior associated with particular segments of the plurality of traffic segments.

15 Claims, 16 Drawing Sheets

(56) References Cited

U.S. PATENT DOCUMENTS

| | | |
|---|---|---|
| 2002/0002504 A1 | 1/2002 | Engel et al. |
| 2006/0036366 A1 | 2/2006 | Kelly et al. |
| 2006/0040710 A1 | 2/2006 | Ruetschi et al. |
| 2006/0053048 A1 | 3/2006 | Tandetnik |
| 2006/0064346 A1 | 3/2006 | Steenstra et al. |
| 2006/0075019 A1* | 4/2006 | Donovan et al. ............. 709/203 |
| 2006/0265281 A1* | 11/2006 | Sprovieri et al. ............... 705/14 |
| 2007/0010942 A1 | 1/2007 | Bill |
| 2007/0105536 A1 | 5/2007 | Tingo |
| 2007/0270132 A1 | 11/2007 | Poosala |
| 2008/0046324 A1 | 2/2008 | Bailey et al. |
| 2008/0228568 A1 | 9/2008 | Williams et al. |
| 2008/0248815 A1* | 10/2008 | Busch ......................... 455/456.5 |
| 2009/0138445 A1* | 5/2009 | White et al. ....................... 707/3 |
| 2009/0234717 A1* | 9/2009 | Wiggins et al. .................. 705/10 |
| 2010/0131501 A1* | 5/2010 | Deeming et al. ............... 707/724 |
| 2011/0218990 A1* | 9/2011 | Jordahl ......................... 707/723 |
| 2011/0289190 A1* | 11/2011 | Chamberlain et al. ........ 709/217 |

* cited by examiner

| User ID | Date | Activity Type/Description | Geographic Location |
|---------|------|---------------------------|---------------------|
| 1231 | 01/01/2011 | Visit Site 1 | 30.305646,-97.696677 |
| 1232 | 01/05/2011 | Visit Site 1 | 30.294607,-97.695837 |
| 1233 | 01/05/2011 | Register Site 2 | 30.009434,-95.382414 |
| 1234 | 03/01/2011 | Visit Site 1; $60 Purchase | 30.004946,-95.390242 |
| 1235 | 04/03/2011 | Visit Site 1; $15 Purchase | 29.809083,-95.368046 |
| 1236 | 04/05/2011 | Visit Site 1 | 30.370413,-95.616494 |
| 1237 | 05/06/2011 | Visit Site 1; $10 Purchase | 38.897678,-77.036517 |
| 1238 | 06/07/2011 | Visit Site 1; $10 Purchase | 38.893667,-77.03035 |

*FIG. 1C*

Conditions for Segment
1) Visit Location more than three times a year.
2) Five or more visits to website while in location.
3) One or more visits to website each month while in location for at least three months in a row.
4) Registered New Account on website while in location.
5) Spent $50 or more at website while in location.
6) Spent more money at website while in location than any other location.

*FIG. 1D*

GEOGRAPHIC SEGMENTATION SYSTEMS AND METHODS

BACKGROUND

Goods and services providers often employ various forms of marketing to drive consumer demand for products and services. Marketing often employs various techniques to expose target audiences to content promoting brands, products, services, and so forth. For example, marketing may include providing promotional content, such as advertisements, to consumers to encourage them to purchase a product or service. Content is often delivered to an audience via television commercials, radio commercials, webpage advertisements and so forth.

In some instances, content providers will attempt to identify their audience and provide content that is specifically tailored for a target audience (e.g., targeted content). For example, a website provider will acquire demographic information of a web site visitor and provide targeted content based on the demographic information. The targeted content is delivered to the audience in hopes of improving the likelihood of the audience taking a desired course of action, often referred to as a conversion. For example, if it has been determined that a visitor has a history of visiting sports related websites, a targeted advertisement for a sports drink may be displayed on the website in hopes of the visitor being persuaded to purchase the sports drink. It is believed that targeted content improves both of the visitor's experience and the web site's overall effectiveness. Similar techniques are employed in other forms of marketing.

To provide targeted advertising, existing techniques take into account demographic information relating to a user's age, gender, and so forth to identify targeted content to be provided to the audience.

SUMMARY

Methods and systems for segmenting traffic based on geography include assigning coordinate location data received with respect to members of a plurality of computing devices to analytics data associated with a plurality of requests for content received from respective ones of the plurality of computing devices. A geographical location of interest is defined. The defining the geographical location of interest includes designating a plurality of points defining boundaries of the geographical location of interest. Respective ones of a plurality of traffic segments are assigned to the plurality of requests for content based in part upon a comparison of the geographical location of interest to coordinate location data assigned to respective ones of the plurality of requests for content. Network traffic metrics are generated for ones of the plurality of traffic segments. The request traffic metrics describe request behavior associated with particular segments of the plurality of traffic segments.

BRIEF DESCRIPTION OF THE DRAWINGS

FIG. 1C illustrates an example of content requests segmented using methods and systems for geographic segmentation in accordance with one or more embodiments.

FIG. 1D depicts an example of segment rules for use with methods and systems for geographic segmentation in accordance with one or more embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. Headings used herein are for organizational purposes only and are not meant to be used to limit the scope of the description.

DETAILED DESCRIPTION OF EMBODIMENTS

Systems and methods for providing geographic segmentation of traffic and generating metrics based on geographic segmentation of traffic are disclosed. In some embodiments, targeted content is provided to a user based on geographic segmentation of traffic.

Figure 1A:
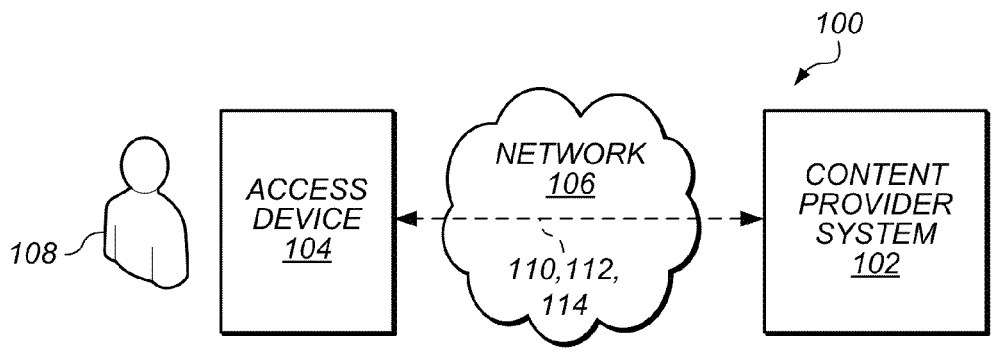
FIG. 1A illustrates an example content system for use with methods and systems for geographic segmentation in accordance with one or more embodiments.

FIG. 1A illustrates an example content system for use with methods and systems for geographic segmentation in accordance with one or more embodiments. System 100 may be employed to acquire user coordinate location data, assign coordinate location data received with respect to members of a plurality of computing devices to analytics data associated with a plurality of requests for content received from respective ones of the plurality of computing devices, define a geographical location of interest, assign to respective ones of a plurality of traffic segments the plurality of requests for content based in part upon a comparison of the geographical location of interest to coordinate location data assigned to respective ones of the plurality of requests for content, and generate network traffic metrics for ones of the plurality of traffic segments. In the illustrated embodiment, system 100 includes a content provider system 102 and an access device 104 communicatively coupled to one another via a network 106.

Access device 104 may include a computer or similar device employed by a user 108 to interact with devices at various locations on network 104. For example, device 104 may include a personal computer, a cellular phone, a personal digital assistant (PDA), or the like. In some embodiments, access device 104 includes a remote access device, such as a wireless communications device. For example, device 104 may include a cellular phone connected to network 106 via a cellular network. Use of a remote access device may enable user 108 to access network 106, and entities connected thereto (e.g., content provider system 102), from a variety of locations remote geographic locations.

Network 106 may include a communications channel for providing effective data exchange between various entities of system 100. In some embodiments, network 106 includes an electronic communication network, such as the internet, a local area network (LAN), a cellular communications network, or the like. Network 106 may include one or more networks that facilitate communication between the entities of system 100. For example, network 106 may include a cellular network coupled to a local area network of content provider system 102 via the internet.

In some embodiments, device 104 may include an application (e.g., user selected/installed mobile application) that can be used to generate a request for content, to provide content, to render content, and/or to exchange requests with various devices on network 106. For example, device 104 may include an internet web-browser or similar application that can be used to transmit/receive data/content 110 via network 106, render data/content 110 on device 104, and/or enable user interaction with content 110 and/or content provider system 102. Device 104 may include an onboard application that records and/or transmits coordinate location data 112 such that whereabouts of user 108 (e.g., geographic locations visited by user 108) may be tracked. In some embodiments, coordinate location data 112 may be accompanied by, or otherwise include additional information regarding user activity at a given geographic location. For example, coordinate location data may include an indication of a geographic location of user 108 and/or access device 104 (e.g., geographic coordinates, such as latitude and longitude or the bearing and distance to a fixed transceiver) at the time of an activity (e.g., user 108 visits a website using access device 104), a user identifier, a time/date of the activity, a type/description of the activity, and so forth.

Device 104 may exchange location data 112 with content provider system 102. For example, access device 104 may transmit location data 112 to content provider system 102 via network 106. In some embodiments, location data 112 is transmitted directly from access device 104 to content provider system 102. For example, access device 104 may include an integrated GPS device that is capable of providing geographical coordinates (e.g., latitude and longitude) indicative of a geographic location of access device 104 and/or user 108. In some embodiments, location data 112 may be obtained via a source external to access device 104. For example, where access device 104 includes a cellular phone, a proxy server for the corresponding cellular network may generate and/or forward location data 112 to content provider system 102.

Coordinate location data 112 may be transmitted to content provider system 102 in response to receiving a user request to access content 110 and/or rendering/executing of content 110 (e.g., a webpage) at device 104. In some embodiments, where a user engages in activity via device 104 (e.g., user 108 visits a website using access device 104), location data 112 may include an indication of a geographic location of user 108 and/or access device 104 at the time of the activity, a user identifier associated with the activity, a time/date of the activity, a type/description of the activity, and so forth. In some embodiments, device 104 may include an application that transmits analytics data to a collection server. For example, device 104 may include an application that transmits location data 112 to an analytics server, database, or the like of content provider system 102. Interactions with an analytics provider and an analytics server are described in more detail below.

Content provider system 102 may include an entity that provides content to various entities and users of system 100. In some embodiments, content provider system 102 host a content site, such as a website, a file transfer protocol (FTP) site, or other source of content accessible via network 106. For example, content provider system 102 may include one or more web servers having webpages of a website stored thereon. Content provider system 102 may provide content 110 in response to receiving a corresponding request/query 114. For example, in response to receiving, from access device 104, a request 114 for a web page initiated by user 108, content provider system 102 may transmit, via network 106, content 110 that includes a corresponding HTML file for the webpage requests. The HTML file may be rendered for display to user 108 on an electronic display of device 104. Where content provider system 102 includes an analytics system, as a result of rendering or otherwise accessing content 110, corresponding analytics data may be transmitted to content provider system 102 as described in more detail below with regard to at least FIG. 2. For example, rendering of the webpage may cause execution of embedded web-bug code that causes transmission of analytics data to an analytics sever of content provider system 102. In some embodiments, analytics data includes location data 112 including an indication of a geographic location of user 108 and/or access device 104 at the time of an activity (e.g., user 108 visits a website using access device 104), a user identifier, a time/date of the activity, a type/description of the activity, and so forth.

Content provider system 102 may provide for the accumulation and/or processing of location data received. For example, content provider system 102 may store coordinate location data 112 in a database. In some embodiments, raw coordinate location data 112 received from access device 104 may be stored by content provider system 102. For example, raw analytics data may be stored in a database or other memory. In some embodiments, raw location data 112 may include an indication of location that is subsequently processed to determine a geographic location of the user. For example, raw location data may include a geographic coordinates. In some embodiments, the raw location data is processed (e.g., parsed) to facilitate comparison of a geographical location of interest to coordinate location data assigned to respective ones of the plurality of requests for content, geographic location of user 108 and/or access device 104 at or near the time of an activity (e.g., user 108 visits a website using access device 104), a user identifier associated with the activity, a time/date of the activity, a type/description of the activity, and so forth. For example, the raw coordinate location data (e.g., geographic coordinates) may be processed to identify a corresponding continent, country, state, county, city, zip code, address, or the like that is of interest, as described in more detail below with respect to FIGS. 6B-6C. The processed data may be stored in a database or other memory. In some embodiments, coordinate location data 112 is acquired over time to generate accumulated location data, as discussed below.

Figure 1B:
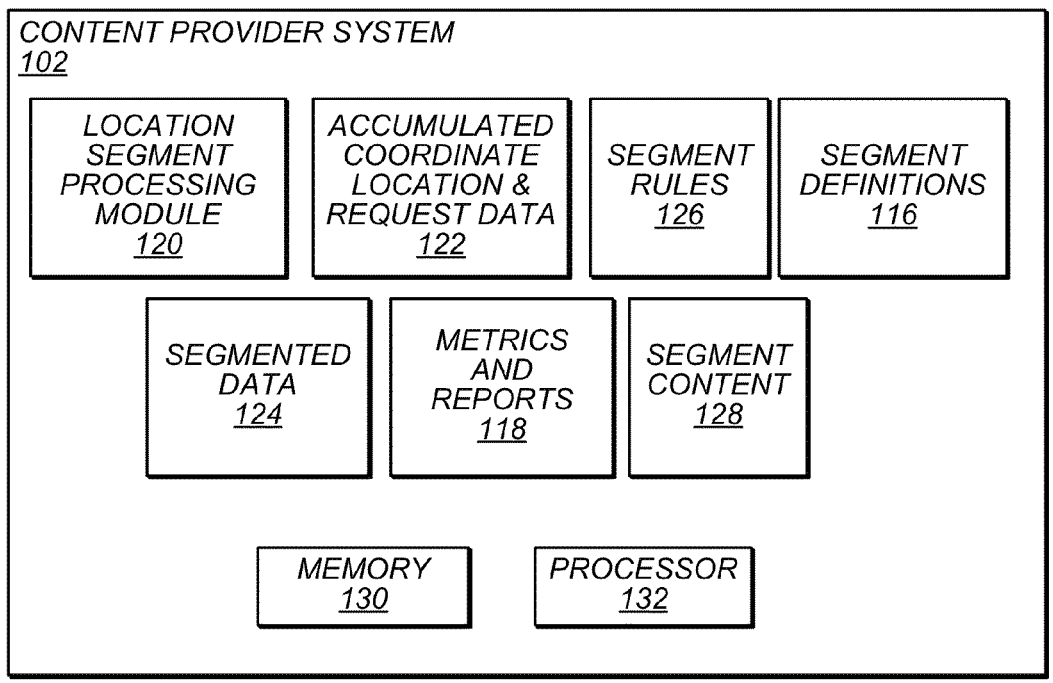
FIG. 1B depicts a content provider system equipped for use with methods and systems for geographic segmentation in accordance with one or more embodiments.

FIG. 1B depicts a content provider system equipped for use with methods and systems for geographic segmentation in accordance with one or more embodiments. In the illustrated embodiment, content provider system 102 includes a location segment processing module 120, accumulated coordinate location and request data 122, segmented data 124, segment rules 126, segment definitions 116, metrics and reports, segment content 128, memory 130 and processor 132. Module 102 may process accumulated coordinate location and request data 122 to determine geographic locations visited by a user based on the location data, assign to respective ones of a plurality of traffic segments the plurality of requests for content based in part upon a comparison of the geographical location of interest to coordinate location data assigned to respective ones of the plurality of requests for content, identify targeted content to be provided to the user based on the existence or non-existence of an affinity, and/or provide the targeted content to the user. Memory 130 may be the same or similar to system memory 1020 described below with regard to at least FIG. 10. Processor 132 may be the same or similar to processor 1010 described below with regard to at least FIG. 10.

In some embodiments, accumulated coordinate location and request data 122 may include an accumulation of location data received by content provider system 102. For example, each time a device (e.g., access device 104) transmits location data to content provider system 102, content provider system 102 may store the location data (e.g., in memory 130) to generate a database of accumulated coordinate location and request data 122. In some embodiments, at least partially processed location data may be stored to generate accumulated coordinate location and request data 122. For example, raw analytics data may be processed (e.g., parsed) by location segment processing module 120 to identify a geographic location of user 108 and/or access device 104 at the time of an activity (e.g., user 108 visits a website using access device 104), a user identifier associated with the activity, a time/date of the activity, a type/description of the activity, and so forth. The processed data may be stored to generate accumulated coordinate location and request data 122.

In some embodiments, accumulated coordinate location and request data 122 may include location data corresponding to activities of one or more users over a period time. For example, accumulated location data 122 may include, for one or more websites, location data 112 collected for every website visit by every visitor to the one or more websites in a given time period (e.g., the past year), such that accumulated location data 122 includes a historical database having an entry corresponding to each website visit by every website visitor over the time period. In some embodiments, each entry includes location data that can be used to ascertain the location of a user and/or access device associated with the activity at the time of the activity, such that accumulated coordinate location and request data 122 can be processed to determine geographical locations visited by users over a given period of time. For example, where entries associated with users each correspond to a particular visit to a website by a user and include location data (e.g., a geographical coordinate of user 108 and/or access device 104 at the time of the user visiting the one or more websites), accumulated coordinate location and request data 122 can be processed to determine travel patterns of one or more user over the given time period. Where each entry includes an identifier that is unique to the associated user, accumulated coordinate location and request data 122 can be filtered by a particular user identifier to readily identify locations visited by a particular user associated with the particular user identifier, and, thus, identify travel patterns of the particular visitor over the given time period.

In some embodiments, location data is associated with a specific activity, such as a content request. In other embodiments, however, accumulated coordinate location and request data 122 is gathered on a periodic or continuous basis, without regard to activity by the user. For example, a user's mobile device may have an application that periodically or frequently or continuously reports location information to a server. In some embodiments, accumulated location data 122 is received from a service that aggregates location data from a regular broadcast by access device 104 of a location of user 108 on a recurring or continuous basis. In such embodiments, accumulated coordinate location and request data 122 provides a more continuous picture of location information than is provided from data generated when the user visits a specific company's site or application.

FIG. 1C illustrates an example of content requests segmented using methods and systems for geographic segmentation in accordance with one or more embodiments. Table 150 includes accumulated coordinate location and request data 122 associated with a plurality of users. Accumulated coordinate location data 122 may include entries that are based upon location data 112 received over a given period of time. For example, in the illustrated embodiment, accumulated coordinate location and request data 122 may have been formed based on at least eight strings of location data 112 that were previously received during the year 2011. Each of the received strings of may have been parsed to extract the user identifier 152, a date of the activity 154, a type/description of the activity 156, and the geographic location 158 in latitude and longitude coordinates. For example, incoming strings of analytics data generated by device 104 in response to each of the respective activities may have been parsed by module 102 to extract and store the data for each respective entry. Although the illustrated embodiment includes accumulated coordinate location and request data 122 associated with a single user (e.g., user associated with identifier "1234"), other embodiments, may include any number of entries for any number of users. For example, accumulated location data 122 may include entries associated with a plurality of different user identifiers, and the illustrated table 150 may simply reflect results of filtering the accumulated location data by user ID "1234".

In the illustrated embodiment, location data 104 includes a plurality of entries 151 (e.g., rows) that each include a geographic locations visited by the user. Three segments are shown. A first segment 176 includes data entries with locations within a bounding range of 30.306 and 30.293 as well as between −97.695 and −97.697. A second segment 178 includes data entries with locations within a bounding range of 29.8 and 30.4 as well as between −95.3 and −95.7. A third segment 174 includes data entries with locations within a bounding range of 38.89 and 38,899 as well as between −77.0 and −77.1.

Each of the entries includes a user identifier (ID) 152, a date 154, an activity type/description 156, and a geographic location 158. Identifier 152 may include a unique user identifier, such that entries associated with a given user can be readily identified from entries associated with other identifiers (e.g., different users). In the illustrated embodiment, all of the entries are associated with a particular user ID "1234". For each of the entries, date 154 may provide an indication of when the user when the activity corresponding to particular entry took place and, thus, a geographic location where the user was located at or near the time when the activity took place. In the illustrated embodiment, the date includes the month, day and year. Other embodiments may include other indications of time, such as time of day, day of the week, and so forth. For each of the entries, activity type/description 156 may provide an indication of a type of activity associated with the particular entry or other details relating to the activity. In the illustrated embodiment, the activity type/description identifies whether the entry corresponds to a site visit, a site registration, a purchase via the site, and an amount of the purchase.

Other embodiments may include other information, such as whether the user added items to a cart, a site visitation path taken by the user during a corresponding website visit, and so forth. For each of the entries, geographic location 158 designates a coordinate data, such as a latitude and longitude pair. The geographic location may be compared to boundaries of a physical place (e.g., city), which is decomposed to a series of squares that may each be expressed as a set of 2 bounding values for each of longitude and latitude where the user associated with the identifier for the entry is determined to be, at or near the time of engaging in the given activity at the given date. Other embodiments may include other indications of geographic location, such as a continent, or administrative boundary such as a country, state, county, zip code, address, or the like. Geographic location 158 in some embodiments includes the use of latitude and longitude in degrees, minutes and seconds as opposed to the fractional latitude and longitude shown herein.

As illustrated by table 150 and accumulated coordinate location and request data 122, a user's activities and locations may be tracked over a given period of time such that accumulated coordinate location and request data 122 includes historical geographic location data indicative of one or more geographic locations determined to have been visited by the user in the past. For example, table 150 includes location information spanning at least the time frame of Jan. 1, 2011 to Jun. 7, 2011.

FIG. 1D depicts an example of segment rules for use with methods and systems for geographic segmentation in accordance with one or more embodiments. In the illustrated embodiment, table 170 includes seven rules 126 to be considered when evaluating whether or not a request record should be added to a particular traffic segment. Segment rules 126 may be applied to location data, such as accumulated coordinate and location and request data 122 provided in table 150.

Figure 2:
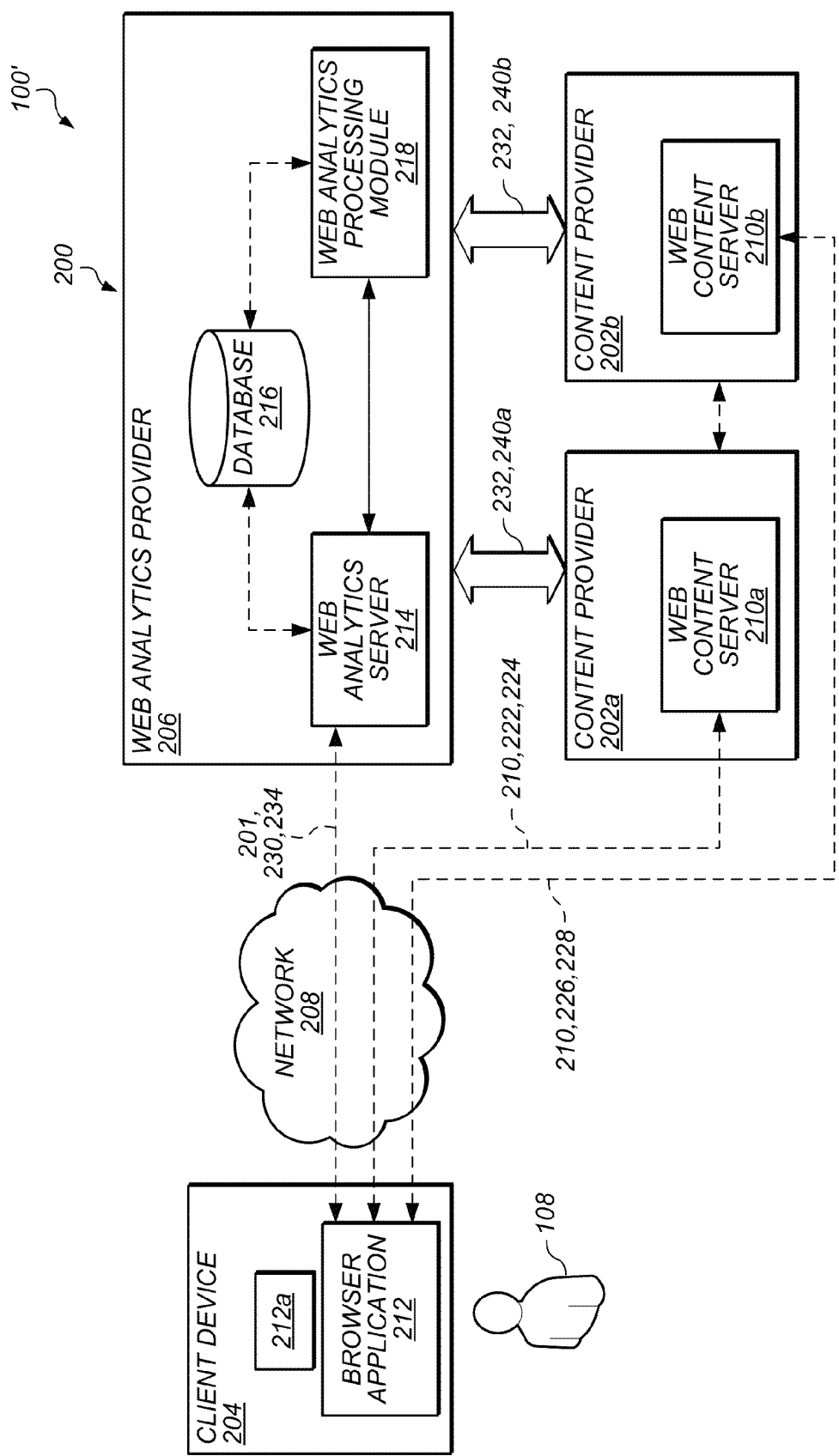
FIG. 2 depicts an example content system, including a web analytics system, in accordance with one or more embodiments.

FIG. 2 depicts an example content system, including a web analytics system, in accordance with one or more embodiments. System 100' may be employed to acquire and/or process analytics data. In some embodiments, analytics data may include location data 112 that is used generate accumulated coordinate location and request data 122. In the illustrated embodiment, system 200 includes content providers 202a and 202b, a client device 204 and a web analytics provider 206.

Each of content providers 202a and 202b, client device 204 and web analytics provider 206 may be communicatively coupled to one another via a network 208. In some embodiments, web analytics system 200, including web analytics provider 206 content providers 202a and/or content provider 202b may be the same or similar to (e.g., provided as a portion of content provider system 102). In some embodiments, client device 204 may be the same or similar to access device 104. In some embodiments, network 208 may be the same or similar to network 106.

During use, user 108 may employ client device 204 to retrieve content from content providers 202a and/or 202b via network 208. Client device 204 may transmit corresponding analytics data 201 to web analytics provider 206 via network 208. Web analytics provider 206 may employ a location segment processing module to determine geographic locations visited by users based on analytics/location data, assign coordinate location data received with respect to members of a plurality of computing devices to analytics data associated with a plurality of requests for content received from respective ones of the plurality of computing devices, define a geographical location of interest, assign to respective ones of a plurality of traffic segments the plurality of requests for content based in part upon a comparison of the geographical location of interest to coordinate location data assigned to respective ones of the plurality of requests for content, generate network traffic metrics for ones of the plurality of traffic segments, identify targeted content to be provided to the user based on the metrics, and/or provide the targeted content to the user. For example, a location affinity processing module (e.g., web analytics processing module 218) may process received analytics data 201, extract location data 112 from the analytics data 201, determine geographic locations visited by users 108 based on location data 112, and generate segmented data and metrics of segmented data for use in identifying targeted content to be provided to the user, and employ at least one of content providers 202a or 202b to provide the targeted content to client device 204, such that the targeted content can be provided to user 108.

Content providers 202a and/or 202b may include source of information/content (e.g., an HTML file defining display information for a webpage) that is provided to client device 204. For example content providers 202a and/or 202b may include vendor websites used to present retail merchandise to a consumer. In some embodiments, content providers 202a and 202b may include respective web content servers 210a and 210b. Web content servers 210a and 210b may include web content 210 stored thereon, such as HTML files that are accessed and loaded by client device 204 for viewing webpages of content providers 202a and 202b. In some embodiments, content providers 202a and 202b may serve client 204 directly. For example, content 210 may be provided from each of servers 210a or 210b directly to client 204. In some embodiments, one of content providers 202a and 202b may act as a proxy for the other of content providers 202a and 202b. For example, server 210a may relay content 210 from server 210b to client device 204.

Client device 204 may include a computer or similar device used to interact with content providers 202a and 202b. In some embodiments, client device 204 includes a wireless device employed by user 108 to access content 210 (e.g., web pages of a websites) from content providers 202a and 202b via network 208. For example, client device 204 may include a personal computer, a cellular phone, a personal digital assistant (PDA), or the like. In some embodiments, client device 204 may include an application (e.g., internet web-browser application) 212 that can be used to generate a request for content, to render content, and/or to communicate request to various devices on the network. For example, upon selection of a website link on a webpage displayed to the user by browser application 212, browser application 212 may submit a request for the corresponding webpage/content to web content server 210a, and web content server 210a may provide corresponding content 210, including an HTML file, that is executed by browser application 212 to render the requested website for display to the user. In some instances, execution of the HTML file may cause browser application 212 to generate additional request for additional content (e.g., an image referenced in the HTML file as discussed below) from a remote location, such as content providers 202a and 202b and/or web analytics provider 206. The resulting webpage 212a may be viewed by a user via a video monitor or similar graphical presentation device of client device 204.

Web analytics provider 206 may include a system for the collection and processing of web analytics data 201, and the generation of corresponding web analytics reports including various metrics of the web analytics data (e.g., a promotion effectiveness index and/or a promotion effectiveness ranking). Web analytics data 201 may include data that describes usage and visitation patterns for websites and/or individual webpages within the website. Web analytics data 201 may include information relating to the activity and interactions of one or more users with a given website or webpage. For example, web analytics data 201 may include historic and/or current website browsing information for one or more website visitors, including, but not limited to identification of links selected, identification of web pages viewed, identification of conversions (e.g., desired actions taken—such as the purchase of an item), number of purchases, value of purchases, and other data that may help gauge user interactions with webpages/websites.

In some embodiments, analytics data 201 includes location data 112. Analytics data 201 may include an indication of a geographic location of user 108 and/or access device 104 at the time of an activity (e.g., user 108 visits a website using access device 104), a user identifier, a time/date of the activity, a type/description of the activity, and so forth. In some embodiments, web analytics data 201 can be used to assess a user's activity and the corresponding geographic location of the user during the activities.

In some embodiments, web analytics data 201 is accumulated over time to generate a set of web-analytics data (e.g., a web analytics dataset) that is representative of activity and interactions of one or more users with a given website or webpage. For example, a web analytics dataset may include analytics data associated with all user visits to a given website. The set of web-analytics data may include, or otherwise be used to generate, accumulated location data 122.

Web analytics provider 206 may include a third-party website traffic statistic service. Web analytics provider 206 may include an entity that is physically separate from content providers 202a and 202b. Web analytics provider 206 may reside on a different network location from content providers 202a and 202b and/or client device 204. In the illustrated embodiment, for example, web analytics provider 206 is communicatively coupled to client 204 via network 208. Web analytics provider 206 may be communicatively coupled to content providers 202a and 202b via network 208. Web analytics provider 206 may receive web analytics data 201 from client device 204 via network 208 and may provide corresponding web analytics data (e.g., web analytics reports) to content provider 202a and 202b via network 208 or some other form of communication.

In the illustrated embodiment, web analytics provider 206 includes a web analytics server 214, a web analytics database 216, and a web analytics processing module 218. Processing module 218 may include computer executable code (e.g., executable software modules) stored on a computer readable storage medium that is executable by a computer to provide associated processing. For example, processing module 218 may process web analytics datasets stored in database 216 to generate corresponding web analytics reports that are provided to content providers 202a and 202b. Web analytics processing module 218 may include location segment processing module 120.

Web analytics server 214 may service requests from one or more clients. For example, upon loading/rendering of a webpage 212a by browser 212 of client device 204, browser 212 may generate a request to web analytics server 214 via network 208. Web analytics server 214 and/or processing module 218 may process the request and return appropriate content (e.g., an image) 210 to browser 212 of client device 204. In some embodiments, the request includes a request for an image, and web analytics provider 206 simply returns a single transparent pixel for display by browser 212 of client device 204, thereby fulfilling the request. The request itself may also include web analytics data embedded therein. Some embodiments may include content provider 202a and/or 202b embedding or otherwise providing a pointer to a resource, known as a "web bug", within the HTML code of the webpage 212a provided to client device 204. The resource may be invisible in to the user 108, such as a transparent one-pixel image for display in a web page. The pointer may direct browser 212 of client device 204 to request the resource from web analytics server 214. Web analytics server 214 may record the request and any additional information associated with the request (e.g., the date and time, and/or identifying information that may be encoded in the resource request).

In some embodiments, an image request embedded in the HTML code of the webpage may include codes/strings that are indicative of web analytics data, such as data about a user/client, the user's computer, the content of the webpage, or any other web analytics data that is accessible and of interest. A request for an image may include, for example, "image.gif/XXX . . . " wherein the string "XXX . . . " is indicative of the web analytics data 201. For example, the string "XXX" may include information regarding user interaction with a website (e.g., location data 112). Web analytics provider 206 may parse the request (e.g., at server 214 or processing module 218) to extract the web analytics data contained within the request. Web analytics data 201 may be stored in web analytics database 216, or a similar storage/memory device, in association with other accumulated web analytics data. In some embodiments, processing module 218 may receive/retrieve web analytics data from web analytics server 214 and/or database 216. Web analytics processing module 218 may process the web analytics data to generate one or more web analytics reports. For example, web analytics report module 214 may filter the raw web analytics data received at web analytics server 214 to generate concise and complete web analytics reports, as may be requested by a website administrator of one of content providers 202a and 202b. Reports, for example, may include overviews and statistical analyses describing the relative frequency with which various site paths are being followed through the content provider's website, the rate of converting a website visit to a purchase (e.g., conversion), an effectiveness of various promotions, user-locations and so forth.

In some embodiments, user 108 interacts with client device 204 to execute a software application, such as browser application 212, for accessing and displaying one or more webpages 212a. In response to a user command, such as clicking on a link or typing in a uniform resource locator (URL), browser application 212 may issue a webpage request 222 to web content server 210a of content provider 202a via network 208 (e.g., via the Internet). In response to request 222, web content server 210a may transmit the corresponding content 210 (e.g., webpage HTML code 224 corresponding to webpage 212a) to browser application 212. Browser application 212 may interpret the received webpage code 224 to display the requested webpage 212a to user 108 at a user interface (e.g., monitor) of client device 204. Browser application 212 may generate additional requests for content from the servers, or other remote network locations, as needed. For example, if webpage code 224 calls for content, such as an advertisement, to be provided by content provider 202b, browser application 212 may issue an additional request 226 to web content server 210b. Web content server 210b may provide a corresponding response 228 containing requested content 210, thereby fulfilling the request. Browser application 212 may assemble the additional content for display within webpage 212a.

In some embodiments, client device 204 also transmits webpage visitation tracking information to web analytics provider 206. For example, as described above, webpage code 224 may include executable code (e.g., a web bug) to initiate a request for data from web analytics server 214 such that execution of webpage code 224 at browser 212 causes browser 212 to generate a corresponding request (e.g., a web-beacon request) 230 for the data to web analytics server 214. In some embodiments, request 230 may itself have web analytics data (e.g., web analytics data 201) contained/embedded therein, or otherwise associated therewith, such that transmitting request 230 causes transmission of web analytics data from client device 204 to web analytics provider 206. For example, as described above, request 230 may include an image request having an embedded string of data therein. Web analytics provider 206 may process (e.g., parse) request 230 to extract web analytics data 201 contained in, or associated with, request 230. In some embodiments, request 230 from client device 204 may be forwarded from server 214 to database 216 for storage and/or to web analytics processing module 218 for processing.

Web analytics processing module 218 and/or server 214 may process the received request to extract web analytics data 201 from request 230. Where request 230 includes a request for an image, web analytics server 214 may simply return content/image 234 (e.g., a single transparent pixel) to browser 212, thereby fulfilling request 228. In some embodiments, web analytics server 206 may transmit web analytics data and/or a corresponding web analytics reports to content providers 202a and/or 202b, or other interested entities. For example, web analytics data 201 and/or 232 and/or web analytics reports 240a and 240b (e.g., including processed web analytics data) may be forwarded to site administrators of content providers 202a and 202b via network 208, or other forms of communication. In some embodiments, a content provider may log-in to a website, or other network based application, hosted by web analytics provider 206, and may interact with the website/application to generate custom web analytics reports. For example, content provider 202a may log into a web analytics website via website server 214, and may interactively submit request 242 to generate reports for various metrics (e.g., number of conversions for male users that visit the home page of the content provider's website, an effectiveness of a promotion, etc.), and web analytics provider 206 may return corresponding reports (e.g., reports dynamically generated via corresponding queries for data stored in database 216 and processing of the data via module 218). In some embodiments, content providers 202a and 202b may provide web analytics data 201 to web analytics provider 206.

In some embodiments, web analytics provider 206 may provide data that enables content providers 202a and/or 202b to provide targeted content to user. For example, web analytics processing module 218 may process accumulated location data (e.g., received analytics data 201) to determine geographic segments of traffic and identify targeted content to be provided to the user based on the existence or non-existence of an affinity, and direct at least one of content providers 202a or 202b to provide the identified targeted content to client device 204. In some embodiments, the targeted content is stored at the content provider.

Figure 3:
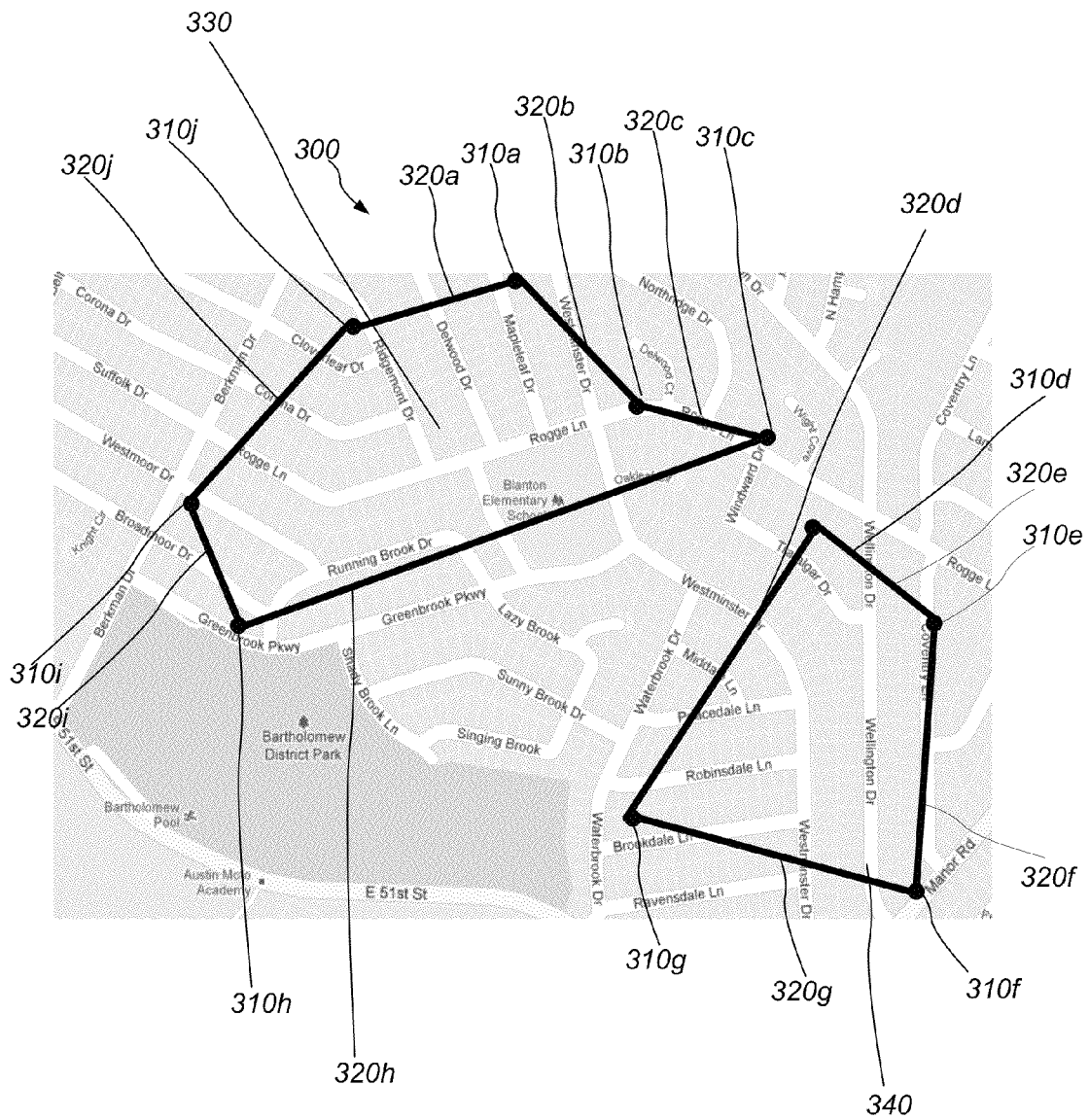
FIG. 3 illustrates an interface for designating a plurality of points defining boundaries of the geographical location of interest according to one embodiment.

FIG. 3 illustrates an interface for designating a plurality of points defining boundaries of the geographical location of interest according to one embodiment. A user may interact with a graphical user interface displaying a map 300 to define a geographical location of interest 330 by designating a plurality of points 310a-310c and 310h-310j defining boundaries 320a-320c and 320h-320j defining the geographical location of interest. For comparison purposes, a user may interact with the graphical user interface displaying the map 300 to define a geographical location of interest 340 by designating a plurality of points 310d-310g defining boundaries 320d-320g defining the geographical location of interest, and comparative metrics for segments including traffic from geographical location of interest 330 and geographical location of interest 340 may be generated.

Figure 4:
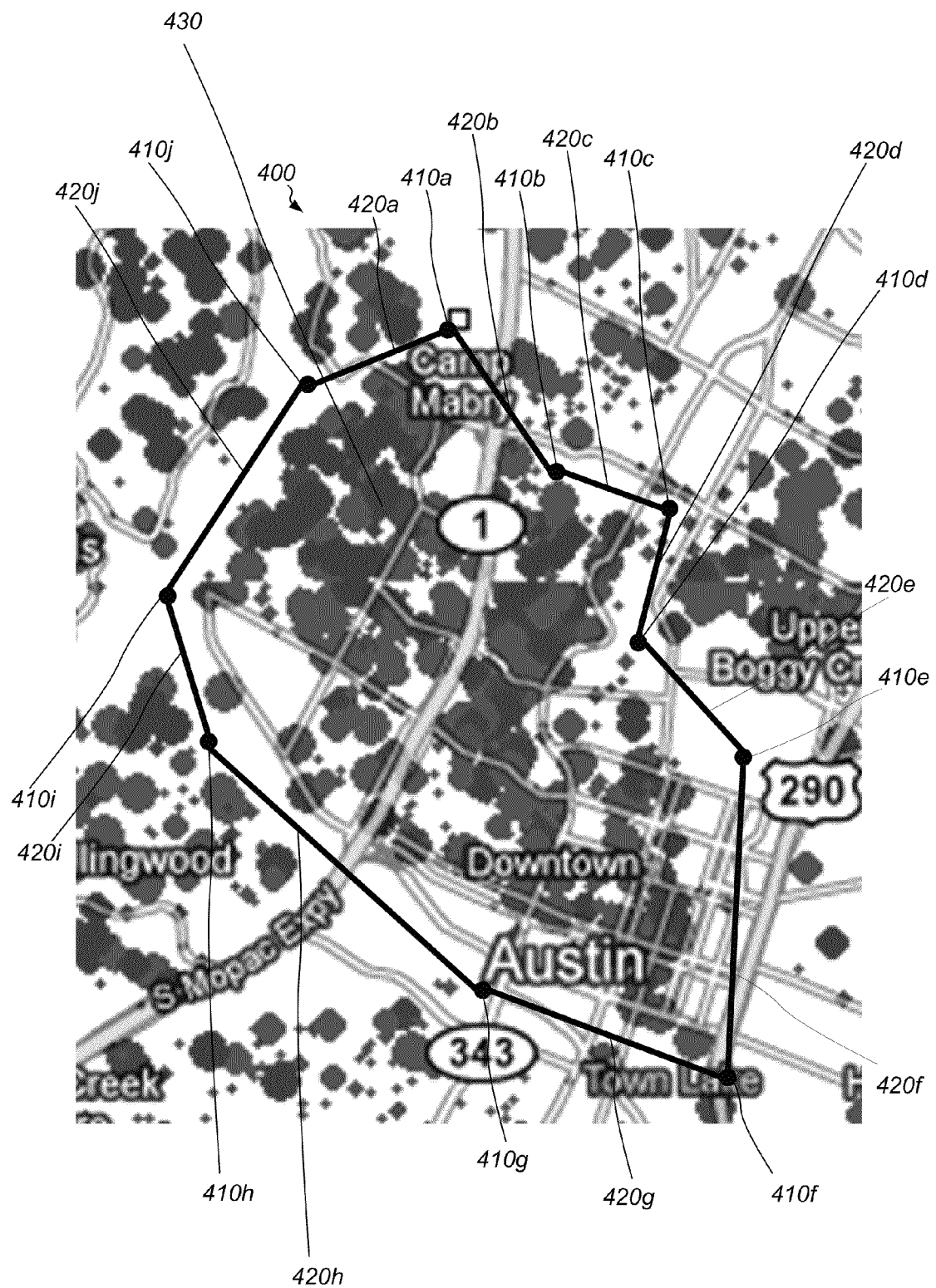
FIG. 4 illustrates an interface for designating a plurality of points defining boundaries of the geographical location of interest by fitting a set of boundary points to boundaries of a set of location units with respective request densities within a selected range according to one embodiment.

FIG. 4 illustrates an interface for designating a plurality of points defining boundaries of the geographical location of interest by fitting a set of boundary points to boundaries of a set of location units with respective request densities within a selected range according to one embodiment. A plurality of requests for content may be presented in a map GUI with corresponding request densities 430 in a plurality location units. Responsive to selection of a location unit from the plurality of location units, a plurality of location units with respective request densities similar to the request density of the location unit may be fitted with a set of boundary points 410a-410j to define boundaries 420a-420j of the plurality of location units with respective request densities similar to the request density of the location unit.

Figure 5:
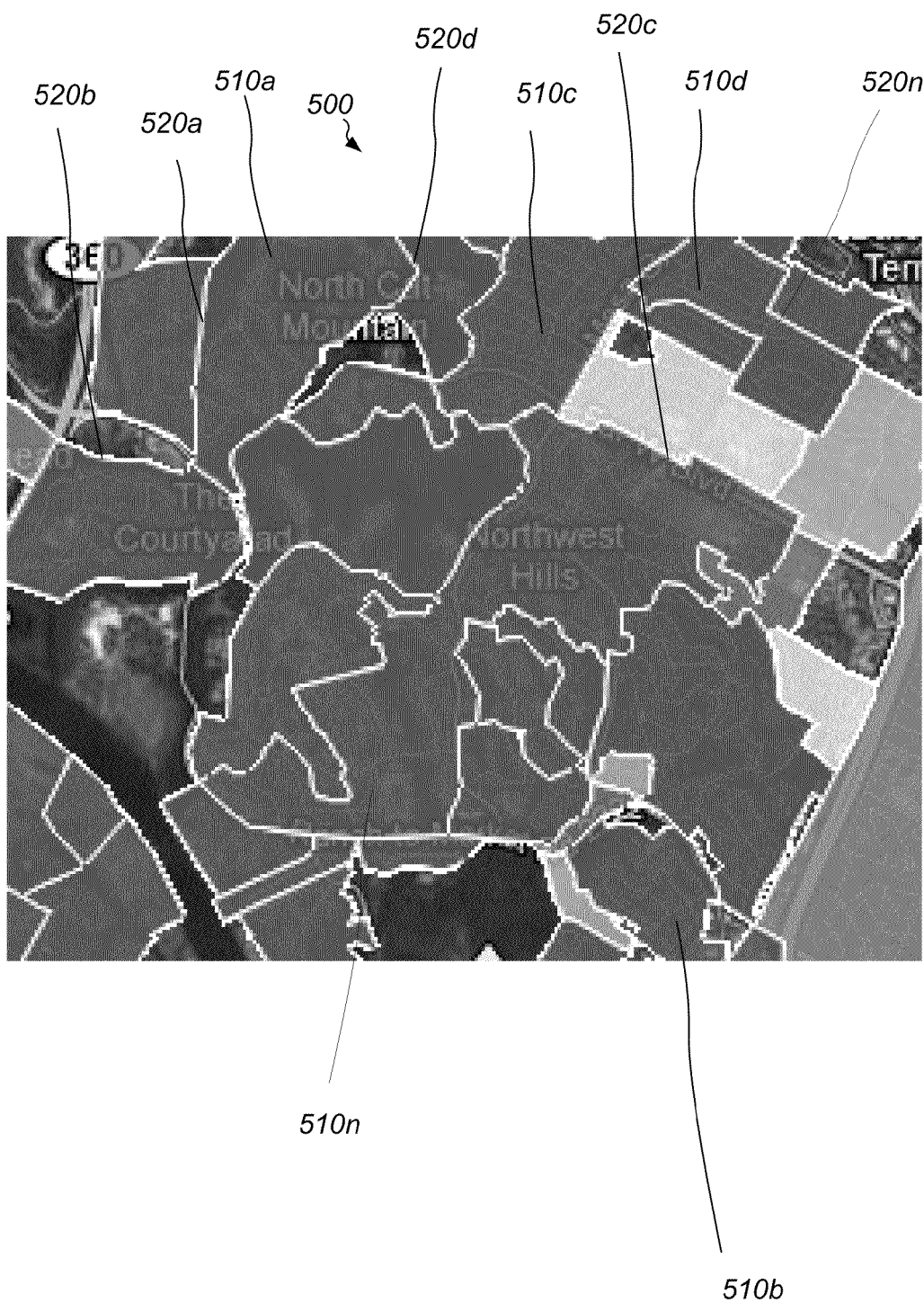
FIG. 5 depicts an interface for designating a plurality of points defining boundaries of the geographical location of interest by fitting a set of boundary points to boundaries of the plurality of location units with respective request densities similar to the request density of the location unit according to one embodiment.

FIG. 5 depicts an interface for designating a plurality of points defining boundaries of the geographical location of interest by fitting a set of boundary points to boundaries of the plurality of location units with respective request densities similar to the request density of the location unit according to one embodiment. A map interface 500 includes a set of boundaries 520a-520n for a set of regions 510a-510n defined by a similar request density.

Figure 6A:
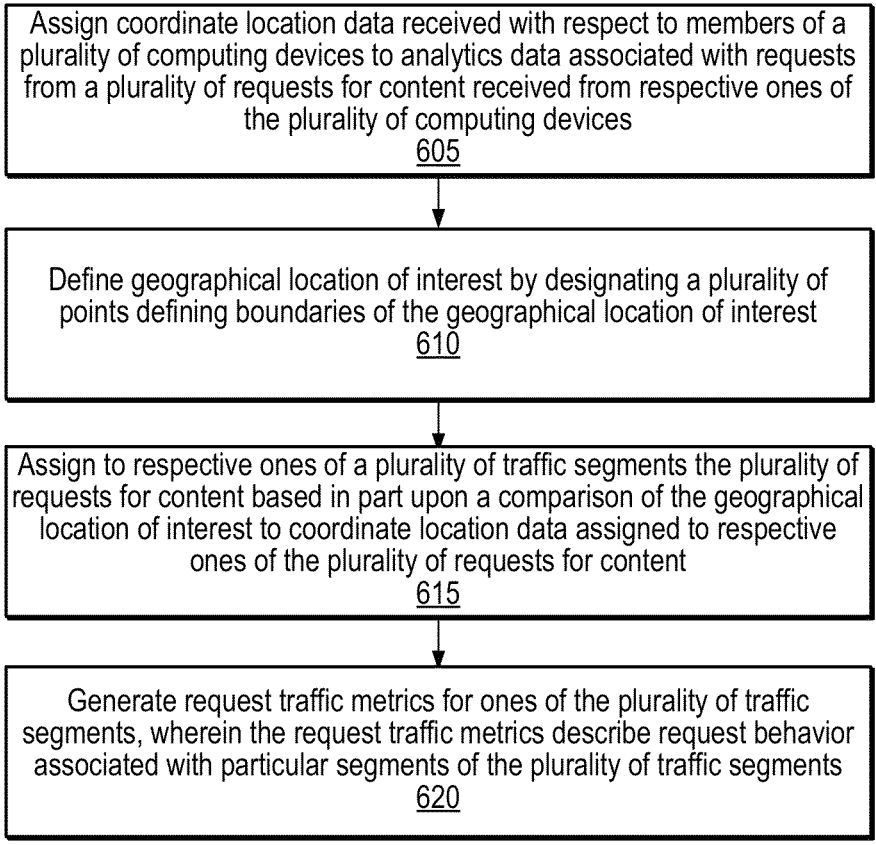
FIG. 6A is a high-level logical flowchart of operations used in segmenting data by location and generating metrics according to one embodiment.

FIG. 6A is a high-level logical flowchart of operations used in segmenting data by location and generating metrics according to one embodiment. Coordinate location data received with respect to members of a plurality of computing devices is assigned to analytics data associated with requests from a plurality of requests for content received from respective ones of the plurality of computing devices (block 605). A geographical location of interest is defined by designating a plurality of points defining boundaries of the geographical location of interest (block 610). The plurality of requests for content based is assigned to respective ones of a plurality of traffic segments in part upon a comparison of the geographical location of interest to coordinate location data assigned to respective ones of the plurality of requests for content (block 615). Requested traffic metrics are generated for ones of the plurality of traffic segments, wherein the request traffic metrics describe request behavior associated with particular segments of the plurality of traffic segments (block 620).

Figure 6B:
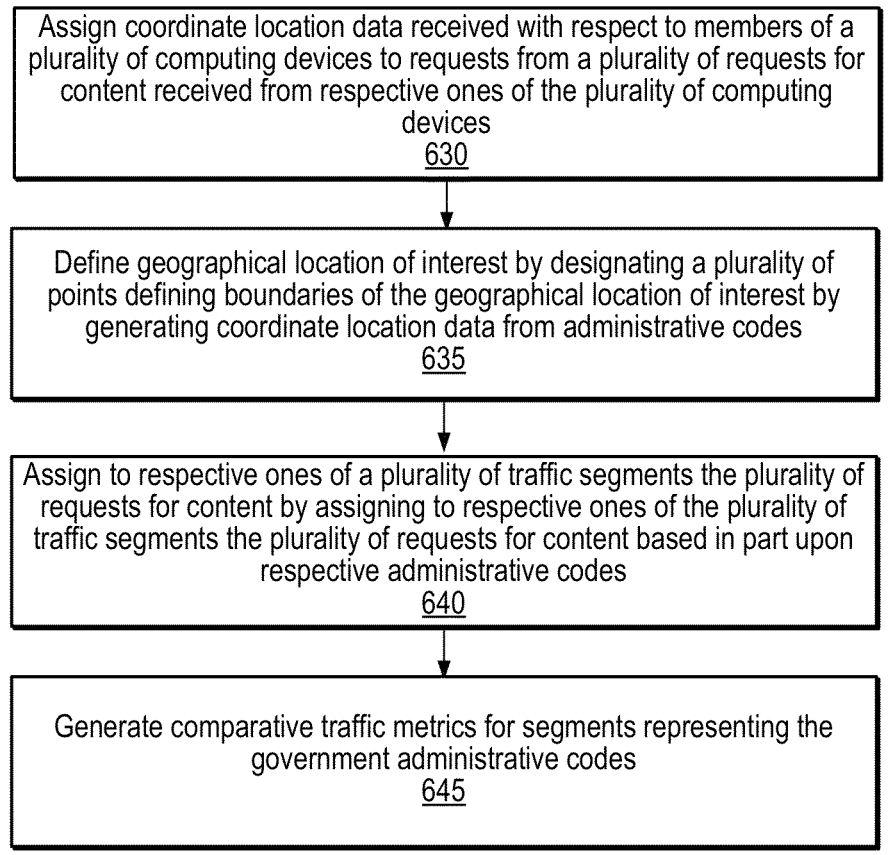
FIG. 6B is a high-level logical flowchart of operations used in segmenting data by location according to government administrative codes and generating metrics according to one embodiment.

FIG. 6B is a high-level logical flowchart of operations used in segmenting data by location according to government administrative codes and generating metrics according to one embodiment. Coordinate location data received with respect to members of a plurality of computing devices is assigned to requests from a plurality of requests for content received from respective ones of the plurality of computing devices (block 630). A geographical location of interest is defined by designating a plurality of points defining boundaries of the geographical location of interest by generating coordinate location data from administrative codes (block 635). The plurality of requests for content is assigned to respective ones of a plurality of traffic segments by assigning to respective ones of the plurality of traffic segments the plurality of requests for content based in part upon respective administrative codes (block 640). Comparative traffic metrics are generated for segments representing the government administrative codes (block 645).

Figure 6C:
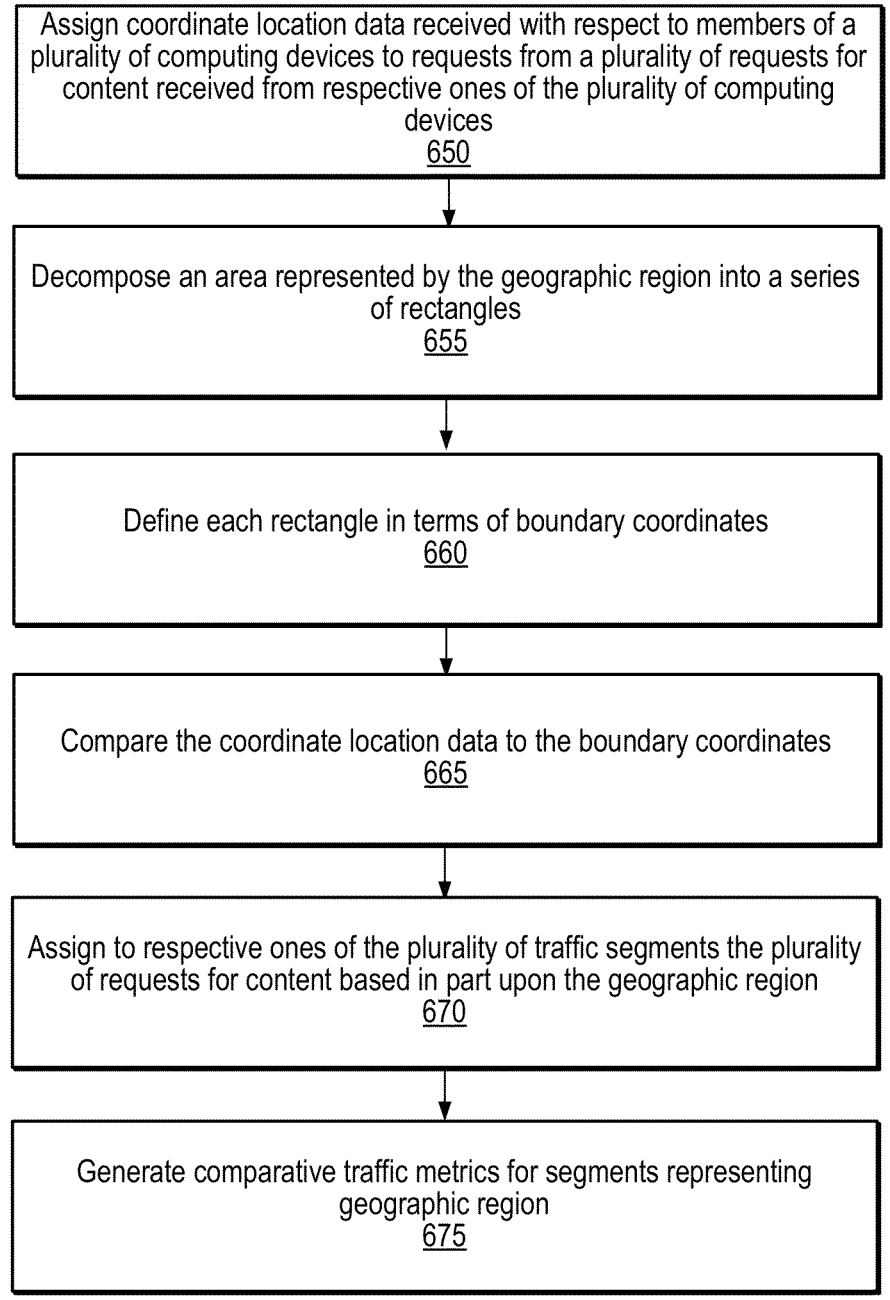
FIG. 6C is a high-level logical flowchart of operations used in segmenting data by location using rectangular decomposition and generating metrics according to one embodiment.

FIG. 6C is a high-level logical flowchart of operations used in segmenting data by location using rectangular decomposition and generating metrics according to one embodiment. Coordinate location data received with respect to members of a plurality of computing devices is assigned to requests from a plurality of requests for content received from respective ones of the plurality of computing devices (block 650). An area represented by a geographic region is decomposed into a series of rectangles (block 655). Each rectangle is defined in terms of boundary coordinates (block 660). The coordinate location data is compared to the boundary coordinates (block 665). Respective ones of the plurality of traffic segments are assigned to the plurality of requests for content based in part upon the geographic region (block 670). Comparative traffic metrics for segments representing geographic region are generated (block 675).

Figure 7:
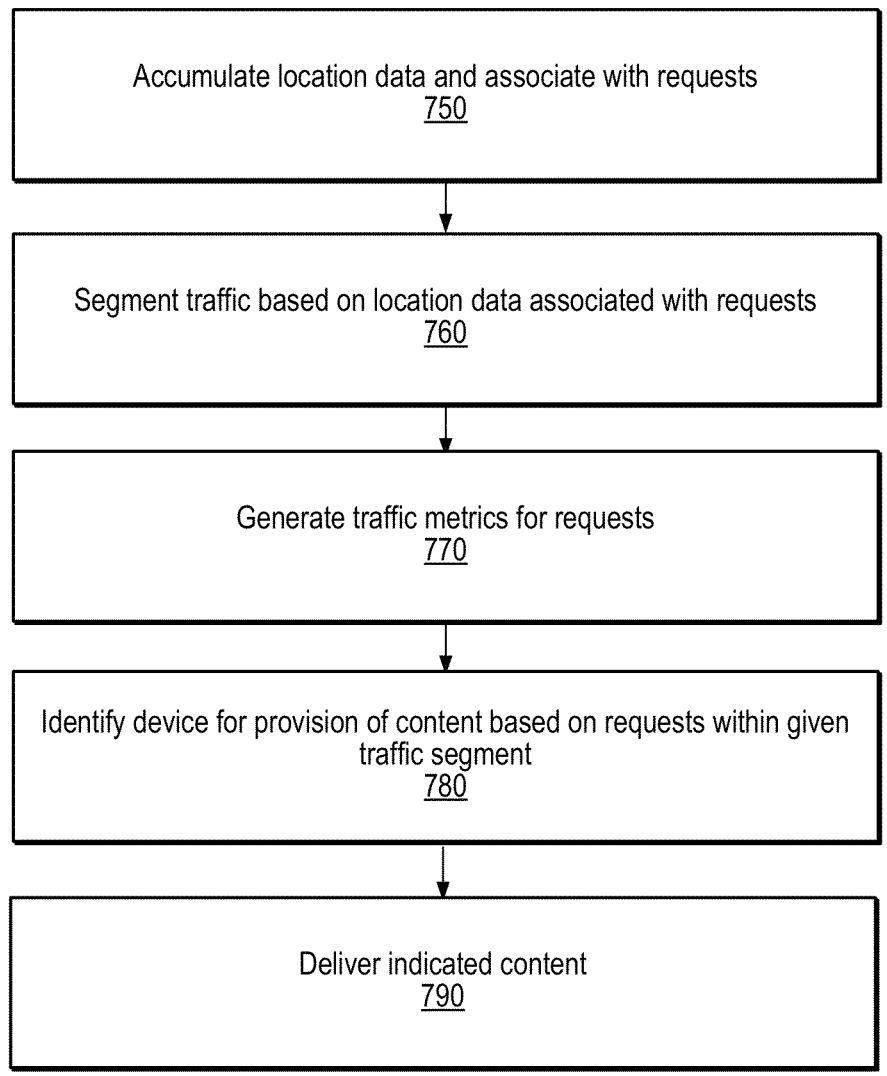
FIG. 7 is a flowchart that illustrates a method of providing content in accordance with one or more embodiments of the present technique.

FIG. 7 is a flowchart that illustrates a method of providing content in accordance with one or more embodiments of the present technique. Location data is accumulated and associated with requests (block 750). Traffic is segmented based on location data associated with requests (block 760). Traffic metrics for requests are generated (block 770). A device is identified for provision of content based on requests within given traffic segment (block 780). Indicated content is delivered (block 790).

Figure 8A:
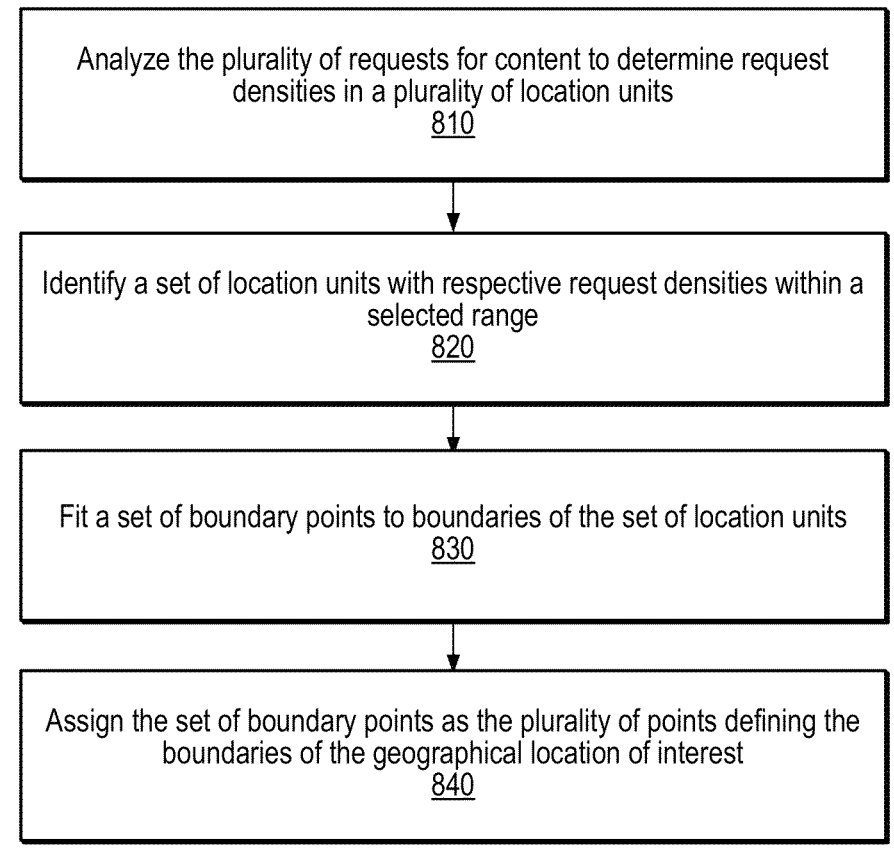
FIG. 8A is a high-level logical flow chart of operations for designating a plurality of points defining boundaries of the geographical location of interest by fitting a set of boundary points to boundaries of a set of location units with respective request densities within a selected range according to one embodiment.

FIG. 8A is a high-level logical flow chart of operations for designating a plurality of points defining boundaries of the geographical location of interest by fitting a set of boundary points to boundaries of a set of location units with respective request densities within a selected range according to one embodiment. The plurality of requests for content is analyzed to determine request densities in a plurality of location units (block 810). A set of location units with respective request densities within a selected range is identified (block 820). A set of boundary points is fitted to boundaries of the set of location units (block 830). The set of boundary points is assigned as the plurality of points defining the boundaries of the geographical location of interest (block 840).

Figure 8B:
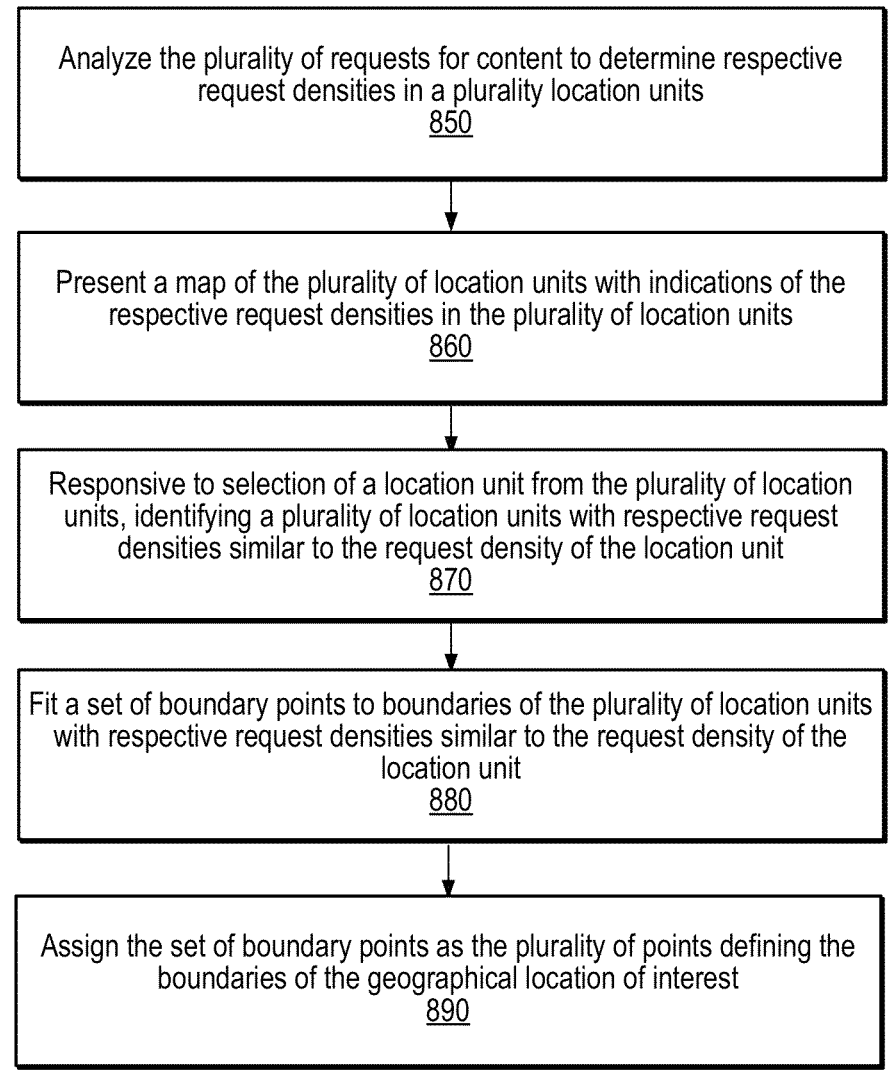
FIG. 8B is a high-level logical flow chart of operations for designating a plurality of points defining boundaries of the geographical location of interest by fitting a set of boundary points to boundaries of the plurality of location units with respective request densities similar to the request density of the location unit according to one embodiment.

FIG. 8B is a high-level logical flow chart of operations for designating a plurality of points defining boundaries of the geographical location of interest by fitting a set of boundary points to boundaries of the plurality of location units with respective request densities similar to the request density of the location unit according to one embodiment. The plurality of requests for content is analyzed to determine respective request densities in a plurality location units (block 850). A map of the plurality of location units is presented with indications of the respective request densities in the plurality of location units (block 860). Responsive to selection of a location unit from the plurality of location units, a plurality of location units is identified with respective request densities similar to the request density of the location unit (block 870). A set of boundary points is fit to boundaries of the plurality of location units with respective request densities similar to the request density of the location unit (block 880). The set of boundary points is assigned as the plurality of points defining the boundaries of the geographical location of interest (block 890).

Figure 9A:
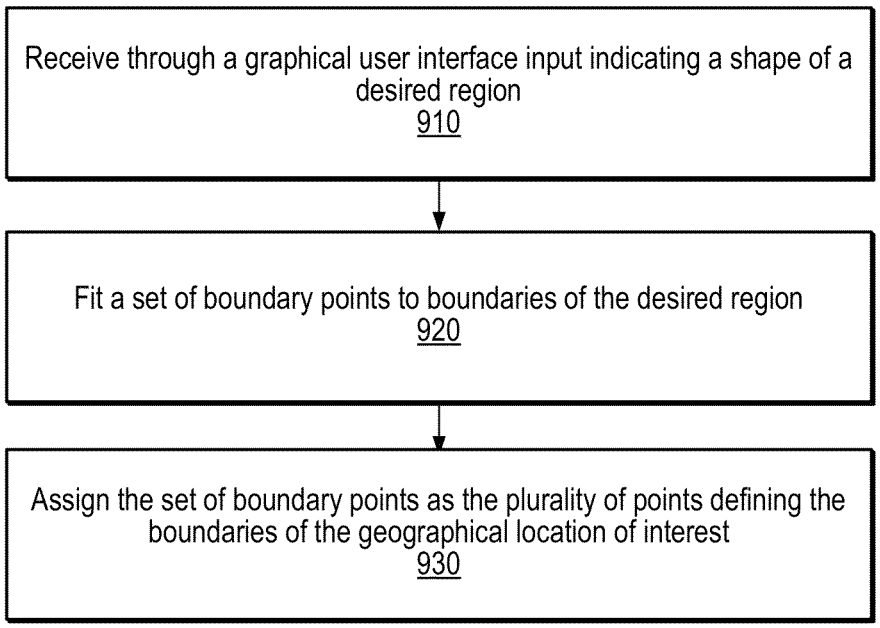
FIG. 9A is a high-level logical flow chart of operations for designating a plurality of points defining boundaries of the geographical location of interest according to one embodiment.

FIG. 9A is a high-level logical flow chart of operations for designating a plurality of points defining boundaries of the geographical location of interest according to one embodiment. Input indicating a shape of a desired region is received through a graphical user interface (block 910). A set of boundary points to boundaries of the desired region (block 920). The set of boundary points is assigned as the plurality of points defining the boundaries of the geographical location of interest (block 930).

Figure 9B:
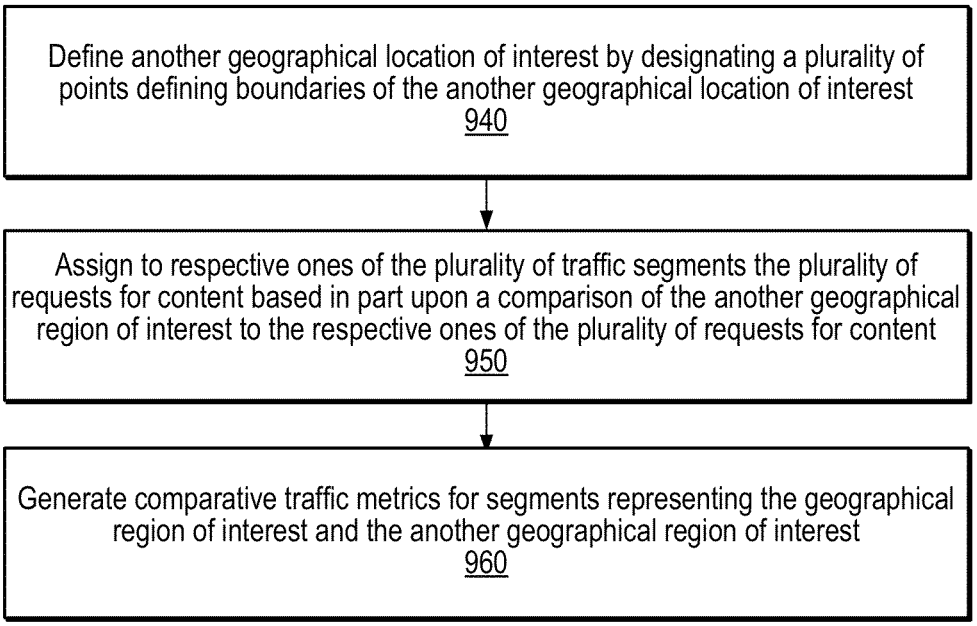
FIG. 9B is a high-level logical flowchart of operations used in segmenting data by location and generating comparative metrics according to one embodiment.

FIG. 9B is a high-level logical flowchart of operations used in segmenting data by location and generating comparative metrics according to one embodiment. Another geographical location of interest is defined by designating a plurality of points defining boundaries of the another geographical location of interest (block 940). The plurality of requests for content is assigned to respective ones of the plurality of traffic segments based in part upon a comparison of the another geographical region of interest to the respective ones of the plurality of requests for content (block 950). Comparative traffic metrics are generated for segments representing the geographical region of interest and the another geographical region of interest (block 960).

Figure 9C:
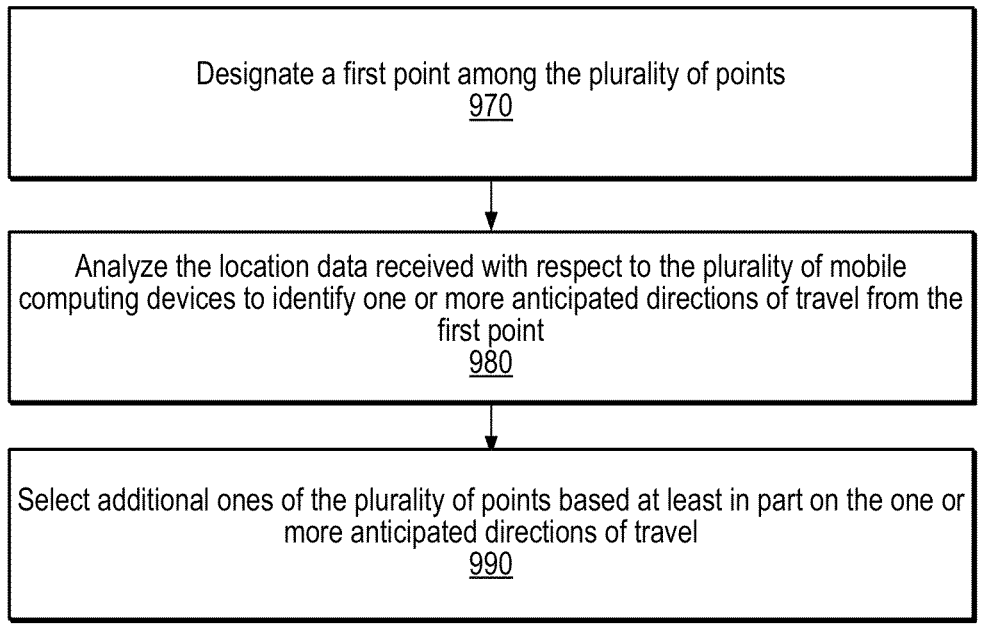
FIG. 9C is a high-level logical flow chart of operations for designating a plurality of points defining boundaries of the geographical location of interest based on an anticipated direction of travel according to one embodiment.

FIG. 9C is a high-level logical flow chart of operations for designating a plurality of points defining boundaries of the geographical location of interest based on an anticipated direction of travel according to one embodiment. A first point is designated among the plurality of points (block 970). The location data received with respect to the plurality of mobile computing devices is analyzed to identify one or more anticipated directions of travel from the first point (block 980). Additional ones of the plurality of points based at least in part on the one or more anticipated directions of travel (block 990).

Example Computer System

Figure 10:
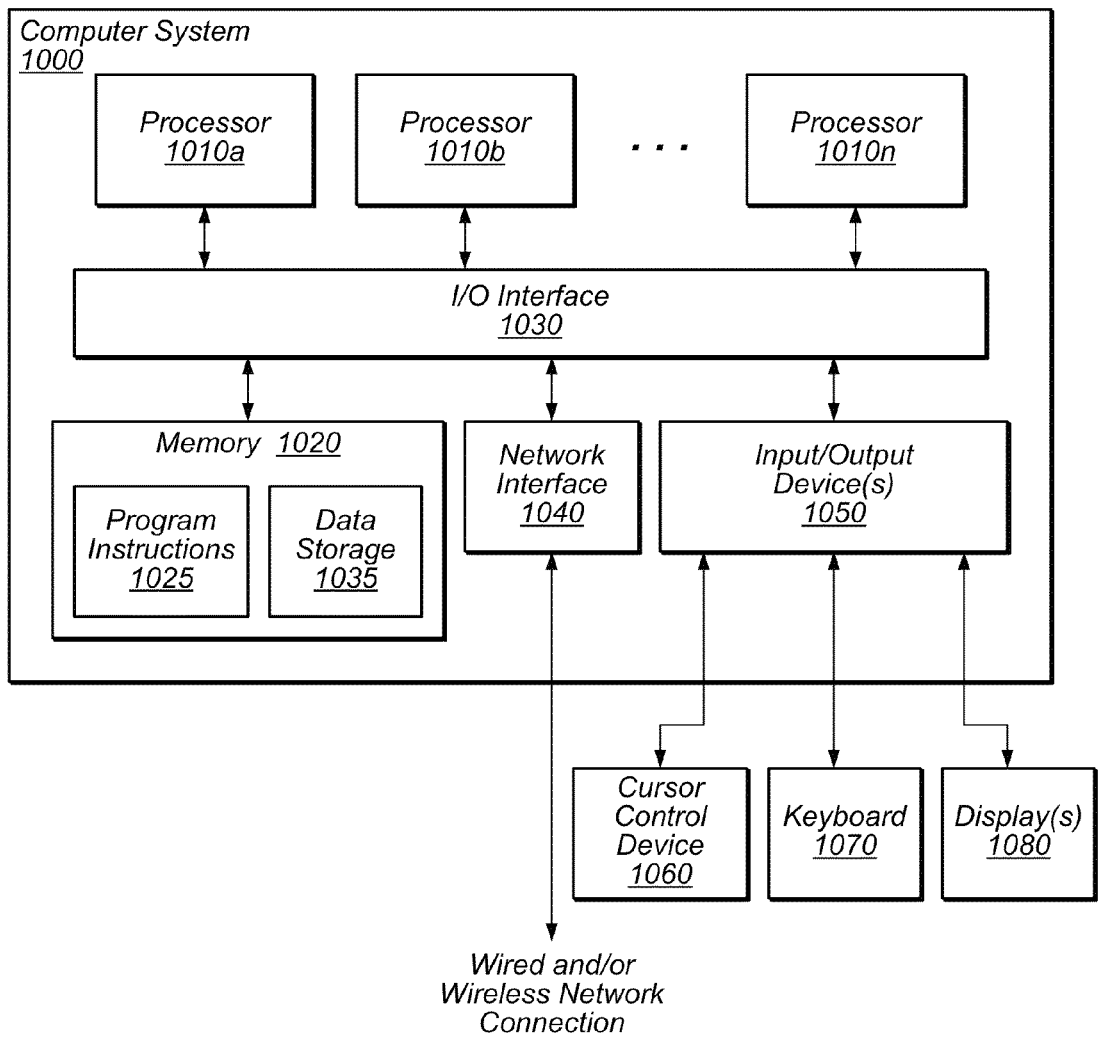
FIG. 10 is a diagram that illustrates an example computer system in accordance with one or more embodiments of the present technique.

FIG. 10 is a diagram that illustrates an example computer system 1000 in accordance with one or more embodiments of the present technique. Various portions of systems 100, 100', and/or 100" and/or the methods and operations described herein, may be executed on one or more computer systems similar to that described herein, which may interact with various other devices of the system. For example, location affinity processing module 102 may be executed on a computer system of content provider system 102 (e.g., a computer system of web analytics provider 300, content providers 202*a* and/or 202*b*, or a standalone computer system). Device 104 and/or client device 204 may include a computer device similar to that of computer system 1000.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, audio device 1090, and display(s) 1080. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. In some embodiments, at least one processor 1010 may be a graphics processing unit.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for a layout-preserved text generation method, are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040. Program instructions may include instructions for implementing the techniques described with respect to method 300.

In some embodiments, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network (e.g., network 106 and/or 208), such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

Memory 1020 may include program instructions 1025, configured to implement embodiments of a layout-preserved text generation method as described herein, and data storage 1035, comprising various data accessible by program instructions 1025. In one embodiment, program instructions 1025 may include software elements of a method illustrated in the above Figures. Data storage 1035 may include data that may be used in embodiments described herein. In other embodiments, other or different software elements and/or data may be included.

Those skilled in the art will appreciate that computer system 1000 is merely illustrative and is not intended to limit the scope of a layout-preserved text generation method as described herein. In particular, the computer system and devices may include any combination of hardware or software that can perform the indicated functions, including computers, network devices, internet appliances, PDAs, wireless phones, pagers, etc. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations. In some embodiments, portions of the techniques described herein (e.g., preprocessing of script and metadata may be hosted in a cloud computing infrastructure.

Various embodiments may further include receiving, sending or storing instructions and/or data implemented in accordance with the foregoing description upon a computer-accessible medium. Generally speaking, a computer-accessible/readable storage medium may include a non-transitory storage media such as magnetic or optical media, (e.g., disk or DVD/CD-ROM), volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

Various modifications and changes may be to the above technique made as would be obvious to a person skilled in the art having the benefit of this disclosure. It is intended that the invention embrace all such modifications and changes and, accordingly, the above description to be regarded in an illustrative rather than a restrictive sense. While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. Any headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to. As used throughout this application, the singular forms "a", "an" and "the" include plural referents unless the content clearly indicates otherwise. Thus, for example, reference to "an element" includes a combination of two or more elements. Unless specifically stated otherwise, as apparent from the discussion, it is appreciated that throughout this specification discussions utilizing terms such as "processing", "computing", "calculating", "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

What is claimed is:

1. A computer-implemented method, the method comprising,
    receiving a coordinate location for each of a plurality of requests for content, each coordinate location recorded and transmitted by a computing device making a respective request for content, each coordinate location identifying where the respective computing device was when the respective request for content was made;
    assigning the coordinate location of each of the plurality of requests for content to analytics data corresponding with the respective request for content;
    defining a geographical location of interest, wherein the defining the geographical location of interest comprises designating a plurality of points defining boundaries of the geographical location of interest;
    assigning to respective ones, according to the requests for content, of a plurality of traffic segments the plurality of requests for content based in part upon a comparison of the geographical location of interest to coordinate location data assigned to respective ones of the plurality of requests for content; and
    generating network traffic metrics for ones of the plurality of traffic segments, wherein the request traffic metrics describe request behavior associated with particular segments of the plurality of traffic segments.

2. The computer-implemented method of claim 1, wherein the method further comprises:
    identifying a computing device from a plurality of computing devices for provision of content based on requests received from the computing device that are assigned to one of the plurality of traffic segments.

3. The computer-implemented method of claim 1, wherein the designating the plurality of points defining boundaries of the geographical location of interest further comprises:
    designating, using a drawing interface, boundaries of an irregular polygon that does not correspond to a political or administrative boundary.

4. The computer-implemented method of claim 1, wherein the assigning the coordinate location data received with respect to the members of a plurality of computing devices to the requests from the plurality of requests for content received from respective ones of the plurality of computing devices further comprises:
    assigning multiple items of the coordinate location data to a single request, and tracking location visit patterns in the multiple items of the coordinate location data.

5. The computer-implemented method of claim 1, wherein the designating the plurality of points defining the boundaries of the geographical location of interest further comprises:
    analyzing the plurality of requests for content to determine request densities in a plurality of location units,
    identifying a set of location units with respective request densities within a selected range, fitting a set of boundary points to boundaries of the set of location units, and assigning the set of boundary points as the plurality of points defining the boundaries of the geographical location of interest.

6. The computer-implemented method of claim 1, wherein the designating the plurality of points defining the boundaries of the geographical location of interest further comprises:

analyzing the plurality of requests for content to determine respective request densities in a plurality location units, presenting a map of the plurality of location units with indications of the respective request densities in the plurality of location units, responsive to selection of a location unit from the plurality of location units, identifying a plurality of location units with respective request densities similar to the request density of the location unit, fitting a set of boundary points to boundaries of the plurality of location units with respective request densities similar to the request density of the location unit, and assigning the set of boundary points as the plurality of points defining the boundaries of the geographical location of interest.

7. The computer-implemented method of claim 1, wherein the designating a plurality of points defining the boundaries of the geographical location of interest further comprises:

receiving through a graphical user interface input indicating a shape of a desired region, fitting a set of boundary points to boundaries of the desired region, and assigning the set of boundary points as the plurality of points defining the boundaries of the geographical location of interest.

8. The computer-implemented method of claim 1, wherein the analytics data comprises, a user identifier, a time and date of the request, and a description of the request.

9. A system, comprising:

at least one processor; and a memory comprising program instructions, wherein the program instructions are executable by the at least one processor to:

receive a coordinate location for each of a plurality of requests for content, each coordinate location recorded and transmitted by a computing device making a respective request for content, each coordinate location identifying where the respective computing device was when the respective request for content was made;

assign the coordinate location of each of the plurality of requests for content to analytics data corresponding with the respective request for content;

define a geographical location of interest, wherein comprises program instructions executable by the at least one processor to designate a plurality of points defining boundaries of the geographical location of interest;

assign to respective ones, according to the requests for content, of a plurality of traffic segments the plurality of requests for content based in part upon a comparison of the geographical location of interest to coordinate location data assigned to respective ones of the plurality of requests for content; and generate network traffic metrics for ones of the plurality of traffic segments, wherein the request traffic metrics describe request behavior associated with particular segments of the plurality of traffic segments.

10. The system of claim 9, wherein the program instructions are further executable by the at least one processor to:

define another geographical location of interest, wherein the defining the another geographical location of interest comprises designating a plurality of points defining boundaries of the another geographical location of interest;

assign to respective ones of the plurality of traffic segments the plurality of requests for content based in part upon a comparison of the another geographical region of interest to the respective ones of the plurality of requests for content; and generate comparative traffic metrics for segments representing the geographical region of interest and the another geographical region of interest.

11. The system of claim 9, wherein the program instructions executable by the at least one processor to designate a plurality of points defining the boundaries of the geographical location of interest further comprise program instructions executable by the at least one processor to designate a first point among the plurality of points, analyze the location data received with respect to the plurality of mobile computing devices to identify one or more anticipated directions of travel from the first point, and select additional ones of the plurality of points based at least in part on the one or more anticipated directions of travel.

12. The system of claim 9, wherein the program instructions executable by the at least one processor to designate a plurality of points defining the boundaries of the geographical location of interest further comprise program instructions executable by the at least one processor to generate coordinate location data from administrative codes;

the program instructions executable by the at least one processor to assign to respective ones of a plurality of traffic segments the plurality of requests for content further comprise program instructions executable by the at least one processor to assign to respective ones of the plurality of traffic segments the plurality of requests for content based in part upon respective administrative codes; and the program instructions executable by the at least one processor to generate network traffic metrics further comprise the program instructions executable by the at least one processor to generate comparative traffic metrics for segments representing the government administrative codes.

13. The system of claim 9, wherein, the program instructions executable by the at least one processor to designate a plurality of points defining the boundaries of the geographical location of interest further comprise program instructions executable by the at least one processor to decompose an area represented by the geographic region into a series of rectangles, and define each rectangle in terms of boundary coordinates; and the program instructions executable by the at least one processor to assign to respective ones of a plurality of traffic segments the plurality of requests for content further comprise program instructions executable by the at least one processor to compare the coordinate location data to a the boundary coordinates, and assign to respective ones of the plurality of traffic segments the plurality of requests for content based in part upon the geographic region; and the program instructions executable by the at least one processor to generate network traffic metrics further comprise program instructions executable by the at least one processor to generate comparative traffic metrics for segments representing geographic region.

14. The system of claim 9, wherein the program instructions executable by the at least one processor to designate a plurality of points defining the boundaries of the geographical location of interest further comprise program instructions executable by the at least one processor to:

receive through a graphical user interface input indicating a shape of a desired region, fit a set of boundary points to boundaries of the desired region, and assign the set of boundary points as the plurality of points defining the boundaries of the geographical location of interest.

15. The system of claim 9, wherein the program instructions executable by the at least one processor to designate the plurality of points defining the boundaries of the geographical location of interest further comprise program instructions executable by the at least one processor to:

analyze the plurality of requests for content to determine respective request densities in a plurality location units, present a map of the plurality of location units with indications of the respective request densities in the plurality of location units, responsive to selection of a location unit from the plurality of location units, identify a plurality of location units with respective request densities similar to the request density of the location unit, fit a set of boundary points to boundaries of the plurality of location units with respective request densities similar to the request density of the location unit, and assign the set of boundary points as the plurality of points defining the boundaries of the geographical location of interest.

\* \* \* \* \*